US012793665B2

(12) United States Patent
Li et al.

(10) Patent No.: US 12,793,665 B2
(45) Date of Patent: Nov. 10, 2026

(54) DISPLAY PANEL AND PREPARATION METHOD THEREFOR, AND ELECTRONIC DEVICE

(71) Applicant: BOE Technology Group Co., Ltd., Beijing (CN)

(72) Inventors: Shulei Li, Beijing (CN); Xue Dong, Beijing (CN); Xin Gu, Beijing (CN); Hua Huang, Beijing (CN); Yichi Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 239 days.

(21) Appl. No.: 18/700,726

(22) PCT Filed: May 5, 2023

(86) PCT No.: PCT/CN2023/092267
§ 371 (c)(1),
(2) Date: Apr. 12, 2024

(87) PCT Pub. No.: WO2023/226712
PCT Pub. Date: Nov. 30, 2023

(65) Prior Publication Data
US 2024/0411196 A1 Dec. 12, 2024

(30) Foreign Application Priority Data
May 26, 2022 (CN) ......................... 202210590095.1

(51) Int. Cl.
*G02F 1/16756* (2019.01)
*G02F 1/167* (2019.01)
(Continued)

(52) U.S. Cl.
CPC ............. *G09G 3/344* (2013.01); *G02F 1/167* (2013.01); *G02F 1/16756* (2019.01);
(Continued)

(58) Field of Classification Search
CPC ............. G02F 1/16756; G02F 1/16757; G02F 1/1685; G02F 1/16766; G02F 1/1677;
(Continued)

(56) References Cited

U.S. PATENT DOCUMENTS 7,612,760 B2 11/2009 Kawai
7,706,051 B2 4/2010 Hattori et al.
(Continued)

FOREIGN PATENT DOCUMENTS

CN 101963733 A 2/2011
CN 102213889 A 10/2011
(Continued)

OTHER PUBLICATIONS

International Search Report for PCT/CN2022/117117 Mailed Dec. 16, 2022.
(Continued)

*Primary Examiner* — Angela M. Medich

(57) ABSTRACT

A display panel, a preparation method therefor, and an electronic device. The display panel comprises: a first substrate and a second substrate arranged oppositely; a reflection layer on one side of the first substrate; a color resist layer on the side of the reflection layer away from the first substrate; a pixel electrode layer on the side of the color resist layer away from the first substrate and comprising multiple sub-pixel electrodes arranged at intervals; a common electrode layer on one side of the second substrate; and pixel isolation columns between first and second substrates and defining multiple sub-pixel regions therebetween, are black and white charged microspheres in the sub-pixel regions, there are at least two sub-pixel electrodes in one sub-pixel region, and the area of orthographic projections of the sub-pixel electrodes in one sub-pixel region is less than that of the color resist layer, on the first substrate.

15 Claims, 5 Drawing Sheets

(51) Int. Cl.

| | |
|---|---|
| ***G02F 1/16761*** | (2019.01) |
| ***G02F 1/16766*** | (2019.01) |
| ***G02F 1/1677*** | (2019.01) |
| ***G02F 1/1685*** | (2019.01) |
| ***G09G 3/34*** | (2006.01) |

(52) U.S. Cl.
CPC ...... *G02F 1/16761* (2019.01); *G02F 1/16766* (2019.01); *G02F 1/1677* (2019.01); *G02F 1/1685* (2019.01)

(58) Field of Classification Search
CPC ...... G02F 1/167; G02F 1/1676; G02F 1/1673; G02F 1/1681; G02F 2001/1678
See application file for complete search history.

(56) References Cited

U.S. PATENT DOCUMENTS

| | | | |
|---|---|---|---|
| 2006/0017865 | A1 | 1/2006 | Tsubata et al. |
| 2009/0128889 | A1* | 5/2009 | Kawase ................ G02F 1/1677 359/296 |
| 2010/0134871 | A1 | 6/2010 | Wang et al. |
| 2011/0102480 | A1 | 5/2011 | Miyasaka et al. |
| 2011/0285756 | A1 | 11/2011 | Sato |
| 2011/0304654 | A1 | 12/2011 | Murayama et al. |
| 2012/0032992 | A1 | 2/2012 | Lim et al. |
| 2012/0069425 | A1 | 3/2012 | Sato |
| 2016/0147097 | A1 | 5/2016 | Makino et al. |
| 2016/0342039 | A1 | 11/2016 | Chen |
| 2018/0082648 | A1 | 3/2018 | Xu et al. |
| 2018/0136531 | A1 | 5/2018 | Moriwaki |
| 2018/0151598 | A1 | 5/2018 | Nakamura |
| 2019/0081220 | A1* | 3/2019 | Wang ................... H10H 20/856 |
| 2020/0033688 | A1 | 1/2020 | Zhang et al. |
| 2021/0012697 | A1 | 1/2021 | Xu et al. |
| 2024/0274056 | A1 | 8/2024 | Huang et al. |

FOREIGN PATENT DOCUMENTS

| | | | |
|---|---|---|---|
| CN | 103309114 | A | 9/2013 |
| CN | 103984147 | A | 8/2014 |
| CN | 104122732 | A | 10/2014 |
| CN | 106324881 | A | 1/2017 |
| CN | 104317132 | B | 6/2017 |
| CN | 114764205 | A | 7/2022 |
| CN | 113728375 | B | 1/2023 |
| JP | 2011237582 | A | 11/2011 |
| WO | 2014147731 | A1 | 9/2014 |

OTHER PUBLICATIONS

International Search Report for PCT/CN2023/092267 Mailed Aug. 12, 2023.
Office Action dated Mar. 19, 2025 for U.S. Appl. No. 18/290,924.
Office Action dated Nov. 19, 2024 for U.S. Appl. No. 18/290,924.
CN First Office Action, Application No. 202280003033.4, issued Apr. 7, 2026.

* cited by examiner

DISPLAY PANEL AND PREPARATION METHOD THEREFOR, AND ELECTRONIC DEVICE

CROSS-REFERENCE TO RELATED APPLICATION

The present application is a U.S. National Phase Entry of International Application No. PCT/CN2023/092267 having an international filing date of May 5, 2023, which claims priority to application No. 202210590095.1 filed to the CNIPA on May 26, 2022 and entitled "Display Panel and Preparation Method therefor, and Electronic Device". The above-identified applications are incorporated into the present application by reference in their entireties.

TECHNICAL FIELD

An embodiment of the application relates to, but is not limited to, the display technical field, in particular to a display panel and a preparation method therefor, and an electronic device.

BACKGROUND

A reflection display device is a device structure that uses natural light to display, and may achieve clear display by using ambient light under both strong light and weak light. It has the advantages of a low drive voltage, energy saving and little damage to eyes. At present, the reflection display device may be divided into a capsule type and an ink type according to a material system. The capsule-type reflection display device achieves a black-and-white display through particles in the capsule. The ink-type reflection display device achieves a black-and-white display through particles in ink. Because of the fluidity of ink, a reflection microcup is needed in the structure of the ink-type reflection display device to ensure a certain number of particles in the sub-pixel region, thus ensuring the display effect. Present reflection display devices have some problems in color display, such as large color deviation and low brightness.

Therefore, the present display panel, its preparation method and the electronic device still need to be improved.

SUMMARY

The following is a summary of subject matters described in the present disclosure in detail. This summary is not intended to limit the protection scope of claims.

An embodiment of the present disclosure provides a display panel, including:

- a first substrate and a second substrate arranged opposite to each other, wherein a side of the second substrate is a light incidence side;
- a reflection layer located at a side of the first substrate;
- a color resistance layer located at a side of the reflection layer away from the first substrate;
- a pixel electrode layer located at a side of the color resistance layer away from the first substrate, wherein the pixel electrode layer includes a plurality of sub-pixel electrodes arranged at intervals;
- a common electrode layer located at a side of the second substrate; and
- pixel isolation posts located between the first substrate and the second substrate and defining a plurality of sub-pixel regions between the first substrate and the second substrate, wherein there are black charged microspheres and white charged microspheres in the plurality of sub-pixel regions;
- wherein there are at least two of the sub-pixel electrodes in one of the sub-pixel regions, and an area of orthographic projections of the sub-pixel electrodes in one of the sub-pixel regions on the first substrate is smaller than an area of an orthographic projection of the color resistance layer on the first substrate.

In an exemplary implementation, the color resistance layer includes a plurality of color resistance blocks arranged at intervals, and the reflection layer includes a plurality of reflection blocks arranged at intervals, the reflection blocks and the color resistance blocks are arranged correspondingly.

In an exemplary implementation, the display panel further includes an insulation layer located at a side of the color resistance layer away from the first substrate and covering the color resistance layer and the reflection layer; the insulation layer further comprises a plurality of through holes, orthographic projections of the through holes on the first substrate do not coincide with an orthographic projection of the reflection layer on the first substrate, the orthographic projections of the through holes on the first substrate do not coincide with an orthographic projection of the color resistance layer on the first substrate, the through holes are filled with the pixel electrode layer, and the pixel electrode layer is electrically connected with the first substrate through the through holes.

In an exemplary implementation, the display panel is configured to enable the white charged microspheres to move to the light incidence side when a first voltage is applied to all the sub-pixel electrodes and a second voltage is applied to the common electrode layer, to enable light incident from the light incidence side to be reflected by the white charged microspheres and emitted from the light incidence side to achieve a white state display.

In an exemplary implementation, the display panel is configured to enable the black charged microspheres to move to the light incidence side when a first voltage is applied to all the sub-pixel electrodes and a second voltage is applied to the common electrode layer, to enable light incident from the light incidence side to be absorbed by the black charged microspheres to achieve a dark state display.

In an exemplary implementation, the color resistance blocks include a red color resistance block, a green color resistance block, and a blue color resistance block; the display panel is configured to enable the light incident from the light incidence side to be reflected by the reflection layer and emitted from the light incidence side to achieve a color display when a first voltage and a second voltage are applied to at least two of the sub-pixel electrodes in one of the sub-pixel regions, wherein the first voltage and the second voltage are electrically opposite.

In an exemplary implementation, a difference between the first voltage and the second voltage is −40 to 40V.

In an exemplary implementation, a plurality of sub-pixel electrodes are included in one of the sub-pixel regions, and a difference between voltages applied to adjacent sub-pixel electrodes is a fixed value.

In an exemplary implementation, a number of the sub-pixel electrodes in one of the sub-pixel regions is not greater than 10.

In an exemplary implementation, the sub-pixel electrodes in the sub-pixel regions are arranged at equal intervals.

In an exemplary implementation, a plurality of the sub-pixel electrodes in one of the sub-pixel regions are independently controlled for power supply through a drive circuit unit.

In an exemplary implementation, a material of the reflection layer is a metal material, and a reflectivity of the metal material is not less than 95%.

In an exemplary implementation, a thickness of the color resistance layer is 0.5 to 5 μm.

In an exemplary implementation, a diameter of a charged microsphere is 50 to 300 nm, and a charge-mass ratio of the charged microsphere is 1×107 to 10×107 C/kg.

In an exemplary implementation, the black charged microspheres and the white charged microspheres include spherical charged particles, or nearly spherical charged particles, or both.

An embodiment of the disclosure provides a method for preparing a display panel, which is applied for preparing any of the display panels, the method includes:

- forming a reflection layer on a first substrate;
- forming a color resistance layer on a side of the reflection layer away from the first substrate;
- forming a pixel electrode layer on a side of the color resistance layer away from the first substrate;
- forming a common electrode layer on a second substrate;
- forming pixel isolation posts on the first substrate and/or the second substrate;
- aligning and coupling the first substrate with the second substrate together to form a sub-pixel enclosed space; and
- injecting ink into the sub-pixel enclosed space and performing a sealing treatment to obtain the display panel.

An embodiment of the present disclosure provides a display apparatus which includes any aforementioned display panel.

Other aspects of the present disclosure may be comprehended after the drawings and the detailed descriptions are read and understood.

DETAILED DESCRIPTION

Figure 1:
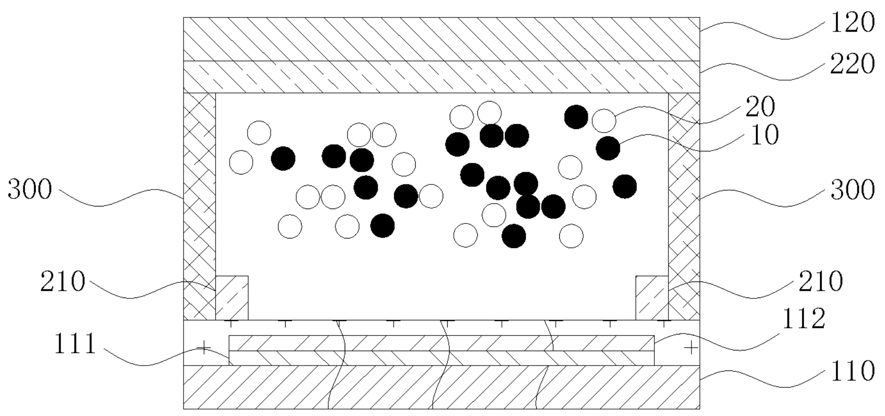
FIG. 1 shows a schematic diagram of a structure of a display panel according to an embodiment of the present disclosure.

Specific implementation modes of the present disclosure will be described further in detail below with reference to the accompanying drawings and embodiments. Following embodiments serve to illustrate the present disclosure, but are not intended to limit the scope of the present disclosure. The embodiments and features in the embodiments of the present disclosure may be randomly combined with each other if there is no conflict.

The present disclosure is described in detail below, and examples of the embodiments are illustrated in the drawings, in which the same or similar reference signs always denote the same or similar components or components having the same or similar functions. The embodiments described below with reference to the accompanying drawings are illustrative, and are merely intended to explain the present disclosure, which cannot be interpreted as a limitation on the present disclosure.

Figure 4:
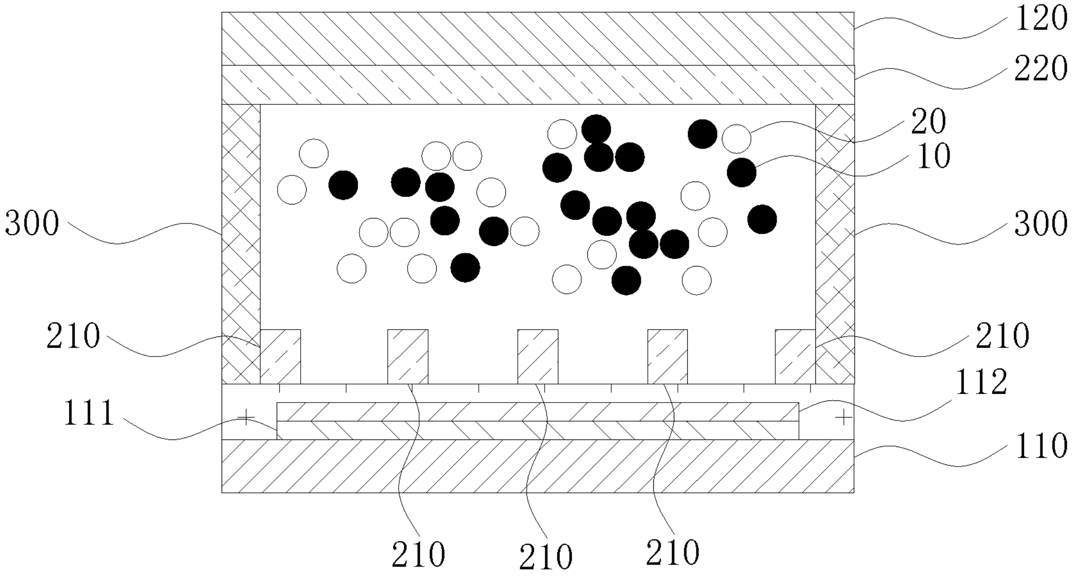
FIG. 4 shows a schematic diagram of a structure of a display panel according to yet another embodiment of the present disclosure.

An embodiment of the present disclosure provides a display panel, referring to FIGS. 1 and 4, including:

- a first substrate 110 and a second substrate 120 arranged oppositely, wherein a side of the second substrate 120 is a light incidence side;
- a reflection layer 111 located at a side of the first substrate 110;
- a color resistance layer 112 located at a side of the reflection layer 111 away from the first substrate 110;
- a pixel electrode layer located at a side of the color resistance layer 112 away from the first substrate 110 and including a plurality of sub-pixel electrodes 210, wherein the plurality of sub-pixel electrodes 210 are arranged at intervals;
- a common electrode layer 220 located at a side of the second substrate 120; and
- pixel isolation posts 300 located between the first substrate 110 and the second substrate 120 and defining a plurality of sub-pixel regions between the first substrate 110 and the second substrate 120, wherein there are black charged microspheres 10 and white charged microspheres 20 in the sub-pixel regions; wherein there are at least two sub-pixel electrodes 210 in one sub-pixel region, and an area of orthographic projections of the sub-pixel electrodes 210 in one sub-pixel region on the first substrate 110 is smaller than an area of an orthographic projection of the color resistance layer 112 in this sub-pixel region on the first substrate 110.

In a display panel of an embodiment of the present disclosure, a horizontal electric field formed by the sub-pixel electrode is increased, and the color resistance layer and the pixel electrode are prepared on the same side of the substrate, which satisfies a white state, a dark state and a color display, and effectively improves a display brightness during the white state display.

A principle that a display panel in an embodiment of the present disclosure has the above beneficial effects is described below.

At present, there are mainly two kinds of colors in a reflection display device, and a color display is achieved by increasing the color types of charged particles in ink, or by adding a color resistance layer on a back plate of a light emitting side.

Figure 2:
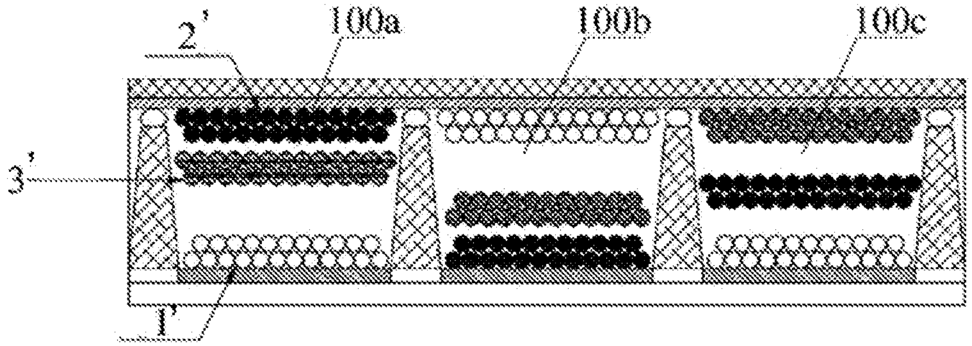
FIG. 2 shows a schematic diagram of a structure of a display panel.

Referring to FIG. 2, when a color display is achieved by increasing the color types of charged particles in ink, for example, when a three-color display is achieved by filling ink having three-color particles (particles 1', 2' and 3') in a reflector cup, or an n-color display is achieved by adding n-color particles in ink, limited to few selectable types of colored particles in ink, the realistic requirements of a plurality of specific colors cannot be met. When the ink contains multicolored particles, it is difficult to control the movement when applying a voltage to drive multiple types of particles. Under the three display effects of 100*a*, 100*b* and 100*c*, it is necessary to accurately control an electric field between the upper and lower substrates, so that particles of different colors are at their corresponding positions to achieve a color display together, it is difficult to operate the devices, resulting in a poor display effect of a final reflection device.

Figure 3:
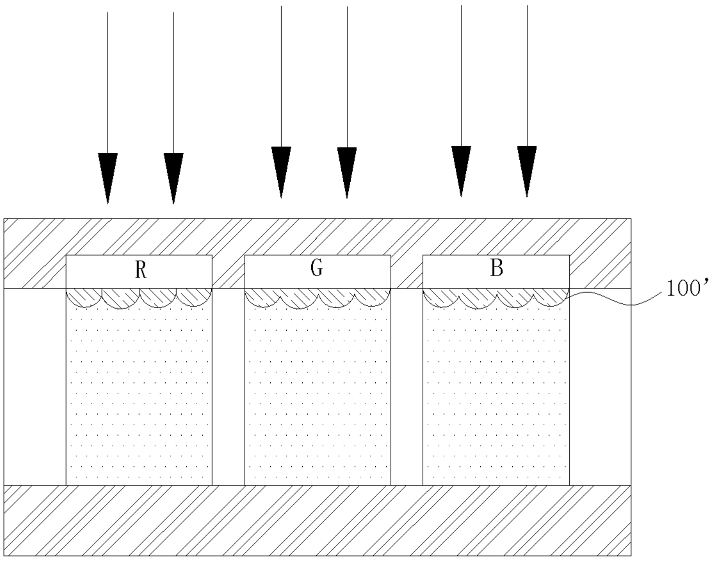
FIG. 3 shows a schematic diagram of a structure of a display panel.

Referring to FIG. 3, when a color display is achieved by adding a color resistance layer on a back plate of a light emitting side, and when a white display is needed, taking the color resistance layer including conventionally a red color resistance layer R, a green color resistance layer G and a blue color resistance layer B as an example, a bright state with red, green and blue mixed colors is needed to achieve the white display, while filtering and absorbing of ambient light by the color resistance layer leads to a large decrease in a final brightness of a white state, and an intensity of the emitted light reflected by the reflection structure 100' is obviously reduced compared with an intensity of the incident light, so that a display brightness of the display device under the white state is poor and cannot meet the use requirements.

According to a display panel in an embodiment of the present disclosure, on a basis of an original vertical electric field of an ink-type reflection display device, referring to FIGS. 1 and 4, a horizontal electric field formed by the plurality of sub-pixel electrodes 210 included in the pixel electrode layer is increased and the color resistance layer 112 and the sub-pixel electrodes 210 are prepared on the same side of the substrate 110, a color display is achieved and for the display panel, the ambient light may not be filtered by the color resistance layer during a white state display, thereby effectively improving a display brightness under the white state, and effectively solving a problem of a low brightness under the white state due to a low transmittance of the color resistance layer in a colored reflection display solution.

For ease of understanding, an operation principle of a display panel in an embodiment of the present disclosure is briefly explained below.

Figure 5:
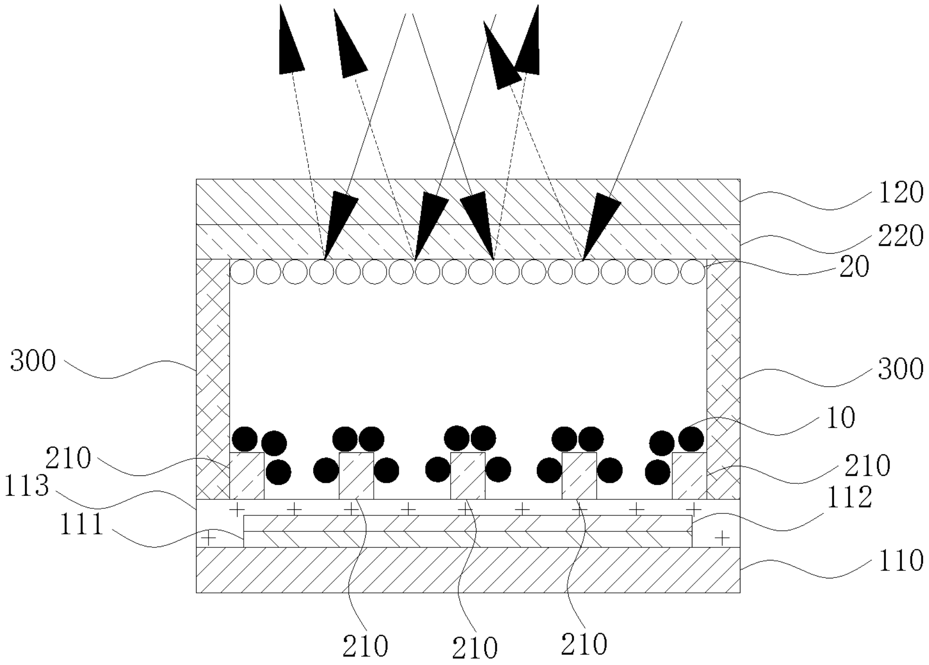
FIG. 5 shows a schematic diagram of a principle of a display panel presenting a white state display according to an embodiment of the present disclosure.

In an exemplary implementation, the display panel is configured to make the white charged microspheres move to the light incidence side when a first voltage is applied to all the sub-pixel electrodes and a second voltage is applied to the common electrode layer, such that light incident from the light incidence side is reflected by the white charged microspheres and emitted from the light incidence side to achieve a white state display. In an exemplary implementation, referring to FIG. 5, when a voltage for attracting the black charged microspheres is applied to all the sub-pixel electrodes, the black charged microspheres are aggregated close to a pixel electrode region, the white charged microspheres are aggregated close to a common electrode region, and the ambient light (as shown by solid arrows in FIG. 5) is reflected at the white microspheres on the light emitting side (as shown by dashed arrows in FIG. 5) to achieve a white state. At this time, the ambient light is directly reflected at the white microsphere without passing through the color resistance layer, which maximizes the use of the ambient light and significantly improves a brightness of the white state.

Figure 6:
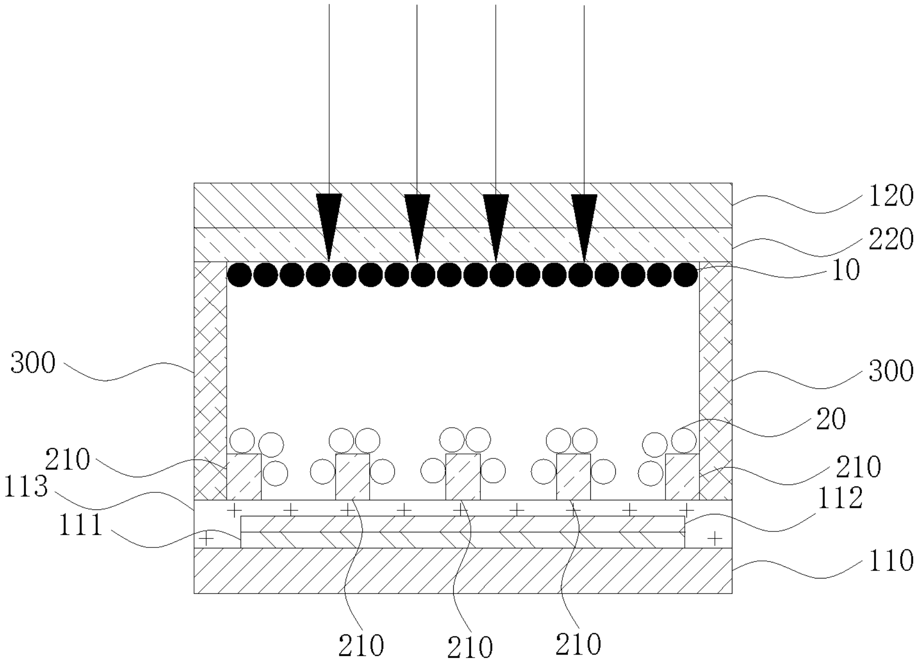
FIG. 6 shows a schematic diagram of a principle of a display panel presenting a dark state display according to an embodiment of the present disclosure.

According to some embodiments of the present disclosure, the display panel is configured to make the black charged microspheres move to the light incidence side when a first voltage is applied to all the sub-pixel electrodes and a second voltage is applied to the common electrode layer, so that light incident from the light incidence side is absorbed by the black charged microspheres to achieve a dark state display. In an exemplary implementation, referring to FIG. 6, when a voltage for attracting white charged microspheres is applied to all the sub-pixel electrodes, the white charged microspheres are aggregated close to the pixel electrode region and the black charged microspheres are aggregate close to the common electrode region. At this time, the ambient light is absorbed at the black microspheres, and the dark state is achieved.

According to some embodiments of the present disclosure, a structure of the color resistance layer 112 is not particularly limited. For example, when the display panel needs to perform a color display, the color resistance layer 112 may include a plurality of color resistance blocks arranged at intervals. At this time, the reflection layer may include a plurality of reflection blocks arranged at intervals, and the reflection blocks are arranged corresponding to the color resistance blocks. In an exemplary implementation, the reflection layer may be of a monolayer structure, as long as it may reflect the incident light. In an exemplary implementation, the color resistance blocks may include a red color resistance block, a green color resistance block, and a blue color resistance block, and the display panel is configured such that when a first voltage and a second voltage are applied to at least two sub-pixel electrodes in one sub-pixel region, the light incident from the light incidence side are reflected by the reflection layer and emitted from the light incidence side to achieve a color display, wherein the first voltage and the second voltage are electrically opposite.

Figure 7:
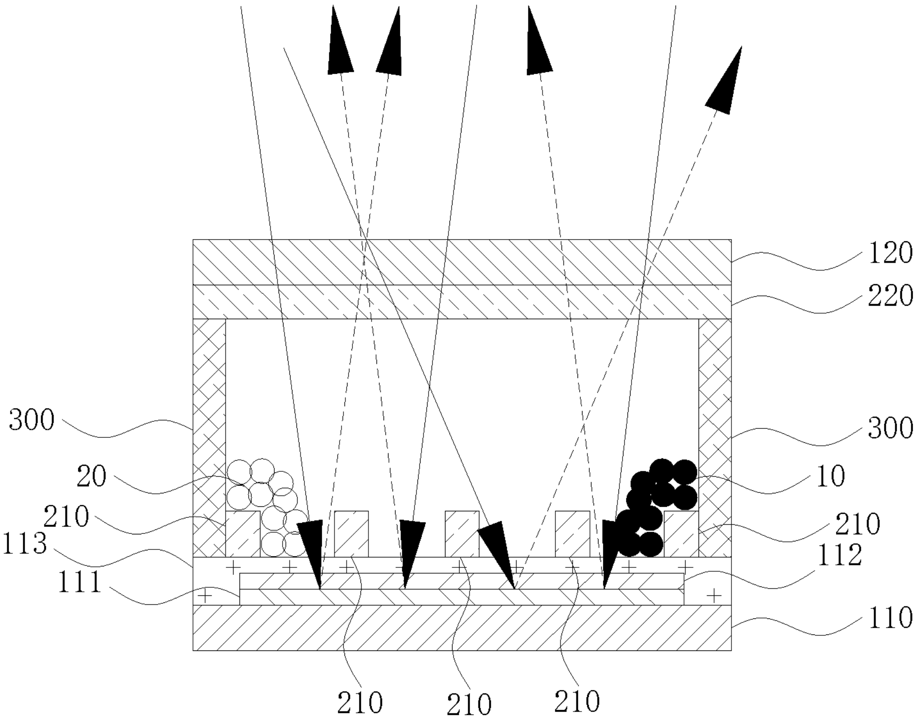
FIG. 7 shows a schematic diagram of a principle of a display panel presenting a color display according to an embodiment of the present disclosure.
Figure 8:
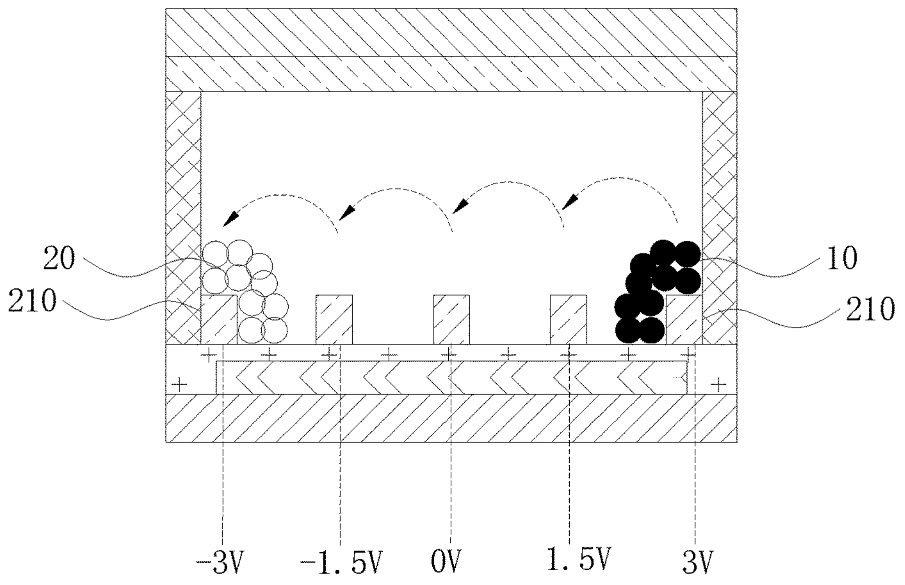
FIG. 8 shows a schematic diagram of a principle of a display panel presenting a color display according to an embodiment of the present disclosure.

In an exemplary implementation, referring to FIGS. 7 and 8, taking the color resistance blocks being the blue color resistance blocks as an example, when the common electrode layer is grounded or is applied with a common voltage having a fixed value, for example, when a voltage of −20V to 20V is applied and a gradient voltage is applied to a plurality of sub-pixel electrodes in one sub-pixel through a thin film transistor corresponding to each of the sub-pixel electrodes, the black charged microspheres and the white charged microspheres are migrated along the illustrated electric field line (referring to a direction indicated by the dashed arrow in FIG. 8), and the black charged microspheres and the white charged microspheres are migrated and aggregated at the sub-pixel electrodes in an edge region of the reflector cup. The external ambient light (as shown by the solid arrow in FIG. 7) shines on the color resistance layer and is filtered into blue light, the blue light is emitted from the reflector cup after being reflected by the reflection layer (as shown by the dashed arrow in FIG. 7), and the sub-pixel display is blue. The ink solution is transparent except the black charged microspheres and the white charged microspheres, and the reflection layer has a higher reflectivity than that of the white charged microspheres. Although the incident light reflected by the reflection layer has a longer optical path length, it still has a higher light intensity. In an exemplary implementation, the sub-pixels may be in different colors when there are color resistance blocks of different colors. A sub-pixel display of a plurality of colors may be achieved through the coordination of color resistance blocks of a plurality of colors, thus achieving a color display of the display panel.

According to some embodiments of the present disclosure, a control mode by which a voltage is applied to the sub-pixel electrodes is not particularly limited, for example, a plurality of sub-pixel electrodes in one sub-pixel region may be independently controlled for power supply by a corresponding drive circuit unit, so that a voltage of each sub-pixel electrode may be controlled. In an exemplary implementation, the drive circuit unit may include a thin film transistor.

Figure 12:
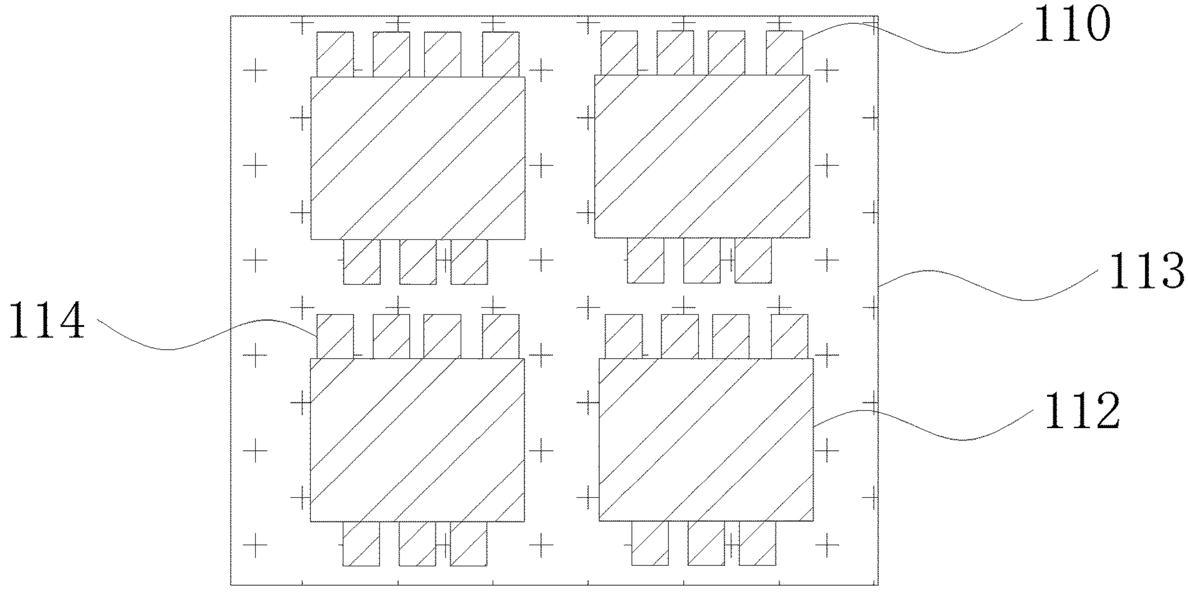
FIG. 12 shows a top view of a partial structure of a display panel according to an embodiment of the present disclosure.

According to some embodiments of the present disclosure, the structure of the display panel is not particularly limited. For example, referring to FIGS. 6 and 12, the display panel may further include an insulation layer 113 located at a side of the color resistance layer 112 away from the first substrate 110 and covering the color resistance layer 112 and the reflection layer 111. According to other embodiments of the present disclosure, the structure of the insulation layer is not particularly limited. For example, referring to FIG. 12 (only the first substrate, the reflection layer (not shown in the figure), the color resistance layer, and the insulation layer are included in the figure), the insulation layer 113 may further include a plurality of through holes 114. Orthographic projections of the through holes 114 on the first substrate 110 do not coincide with an orthographic projection of the reflection layer 111 on the first substrate 110, and the orthographic projections of the through holes 114 on the first substrate 110 do not coincide with an orthographic projection of the color resistance layer 112 on the first substrate 110. The through holes 114 are filled with a material of a pixel electrode layer 210 (that is, the sub-pixel electrodes 210), and the pixel electrode layer (that is, the sub-pixel electrodes 210) is electrically connected to the first substrate 110 through the through holes 114, so that an accurate voltage control may be performed on the sub-pixel electrodes by the drive circuit structure on the first substrate.

According to some embodiments of the present disclosure, the voltages applied to a plurality of sub-pixel electrodes in one sub-pixel region are not particularly limited, as long as there is a certain difference between the voltages applied to adjacent sub-pixel electrodes in one direction. For example, referring to FIG. 1, when there are only two sub-pixel electrodes 210 in one sub-pixel region, a voltage applied to one of the sub-pixel electrodes is a first voltage, and a voltage applied to the other of the sub-pixel electrodes is a second voltage. When a difference between the first voltage and the second voltage is −40 to 40V, the color display effect may be achieved. As another example, referring to FIG. 4 and FIG. 7, when there are a plurality of sub-pixel electrodes 210 in one sub-pixel region, particles are moved more sufficiently under the action of a horizontal electric field. For example, a voltage applied to a sub-pixel electrode close to one edge is a first voltage and a voltage applied to a sub-pixel electrode close to the other edge is a second voltage, as long as a difference between the first voltage and the second voltage is −40 to 40V, and the voltages applied to adjacent sub-pixel electrodes increase or decrease in a direction of the sub-pixel electrodes to which the first voltage is applied towards the sub-pixel electrode to which the second voltage is applied, the color display effect described above may be achieved.

According to some embodiments of the present disclosure, when there are a plurality of sub-pixel electrodes 210 in one sub-pixel region, the values of the voltages applied to the plurality of sub-pixel electrodes are not particularly limited. For example, when a plurality of sub-pixel electrodes are included in one sub-pixel region, a difference between voltages applied to adjacent sub-pixel electrodes may be fixed, thus a uniformity of an electric field formed by adjacent sub-pixel electrodes may be improved, further improving a migration rate of charged microspheres under the electric field, and finally improving a response speed of the display panel. In an exemplary implementation, in one sub-pixel region, a difference between voltages applied to adjacent sub-pixel electrodes may be 0.5 to 5V.

According to some embodiments of the present disclosure, the number of sub-pixel electrodes in the sub-pixel regions is not particularly limited, for example, the number of sub-pixel electrodes in one sub-pixel region may be no more than 10. With the increase of the number of sub-pixel electrodes in the sub-pixel regions, a migration rate of the black charged microspheres and the white charged microspheres will be faster during color display, thus improving a response speed of the display panel. Accordingly, even if the sub-pixel electrodes are transparent electrodes, the sub-pixel electrodes 210 inevitably partially block the color resistance layer and the reflection layer, thereby reducing a size of an area of a single sub-pixel, and when there are too many sub-pixel electrodes in one sub-pixel region, the requirement on the preparation accuracy is high, and each sub-pixel electrode needs to be controlled by an independent thin film transistor, so the process cost is high. When the number of sub-pixel electrodes in one sub-pixel region is not more than 10, both a high response speed of the display panel and a large area of a single sub-pixel may be achieved.

According to some embodiments of the present disclosure, the arrangement interval of the sub-pixel electrodes in the sub-pixel regions is not particularly limited, for example, the sub-pixel electrodes in the sub-pixel regions may be arranged at equal intervals, so that a uniformity of an electric field formed by adjacent sub-pixel electrodes may be improved, thereby improving a migration rate of the charged microspheres under the electric field, and finally improving a response speed of the display panel.

According to some embodiments of the present disclosure, a material of the reflection layer is not particularly limited. For example, when a reflectivity of a material of the reflection layer is not less than 80%, the reflection layer may meet the requirements of color display. In an exemplary implementation, a material forming the reflection layer may be a metal material, and a reflectivity of the metal material may not be less than 95%, so that a color display effect of the display panel may be significantly improved. In an exemplary implementation, the metal material may include a metal having a high reflectivity, such as Ag, Al and the like.

According to some embodiments of the present disclosure, a thickness of the color resistance layer is not particularly limited, as long as it may filter the incident light into monochromatic light of a corresponding color, for example, the thickness of the color resistance layer may be 0.5 to 5 μm.

According to some embodiments of the present disclosure, the charged microspheres include black charged microspheres and white charged microspheres, and a size of the charged microspheres and an amount of charges of the charged microspheres are not particularly limited. For example, a diameter of the charged microsphere may be 50 to 300 nm, and in an exemplary implementation, a charge-mass ratio of the charged microsphere may be $1\times10^7$ to $10\times10^7$ C/kg, so that the response speed of the charged microspheres may be improved.

In an exemplary implementation, the charged microspheres in an embodiment of the present disclosure include spherical charged particles, nearly spherical charged particles, or both spherical charged particles and nearly spherical charged particles, which may be selected according to the actual situation by those skilled in the art.

According to some embodiments of the present disclosure, materials forming the pixel electrode layer and the common electrode layer are not particularly limited, as long as they are transparent electrode materials.

In another aspect of the present disclosure, an embodiment of the present disclosure provide a method of preparing a display panel, the method can be used to prepare any display panel as described above, and has all the features and advantages of the aforementioned display panel, which will not be described here. In an exemplary implementation, the preparation method includes the following acts.

Figure 9:
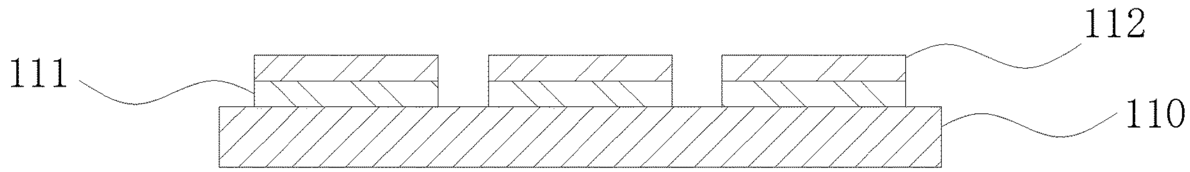
FIG. 9 shows a schematic diagram of a partial structure of a method of preparing a display panel according to an embodiment of the present disclosure.

According to some embodiments of the present disclosure, referring to FIG. 9, in this act, a reflection layer may be formed on the first substrate; and a color resistance layer is formed on a side of the reflection layer away from the first substrate. In an exemplary implementation, a reflection layer 111 may be deposited on the first substrate 110 at first, and is patterned to form a plurality of reflection blocks; and a color resistance layer is prepared on the patterned reflection layer 111 and is patterned, or the color resistance layer may be directly patterned to obtain a plurality of color resistance blocks corresponding to the reflection blocks finally.

Figure 10:
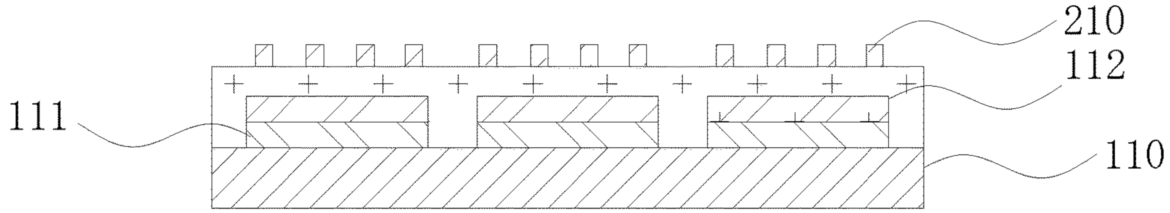
FIG. 10 shows a schematic diagram of a partial structure of a method of preparing a display panel according to yet another embodiment of the present disclosure.

According to some embodiments of the present disclosure, referring to FIG. 10, in this act, a pixel electrode layer is formed on a side of the color resistance layer away from the first substrate. In an exemplary implementation, an insulation layer 113 may be deposited on the color resistance layer 112 at first and is patterned to form a plurality of through holes, so that the sub-pixel electrodes may be electrically connected with a drive circuit below the insulation layer, and then, after the preparation of the insulation layer is completed, a pixel electrode layer is deposited on the insulation layer and is patterned to obtain a plurality of sub-pixel electrodes arranged at intervals.

According to some embodiments of the present disclosure, the insulation layer material is not particularly limited, for example, the material forming the insulation layer may include an organic insulation layer material or an inorganic insulation layer material.

Figure 11:
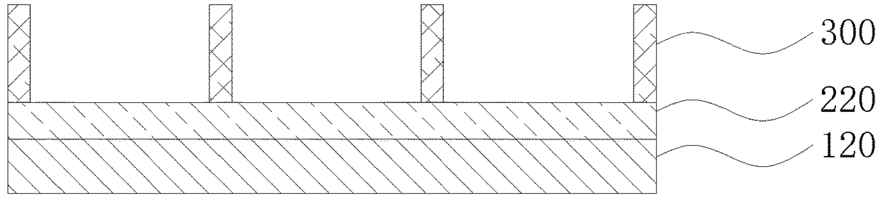
FIG. 11 shows a schematic diagram of a partial structure of a method of preparing a display panel according to yet another embodiment of the present disclosure.

According to some embodiments of the present disclosure, referring to FIG. 11, in this act, a common electrode layer is formed on the second substrate and pixel isolation posts are formed on the first substrate and/or the second substrate, and in an exemplary implementation, a method of forming the pixel isolation posts is not particularly limited, for example, the pixel isolation posts may be formed by using a nanoimprinting process or an exposure development process.

According to some embodiments of the present disclosure, referring to FIGS. 1 and 4, in this act, the first substrate is aligned and coupled with the second substrate to form a sub-pixel enclosed space; ink is injected into the sub-pixel enclosed space and a sealing treatment is performed to obtain a display panel. In this display panel, on a basis of an original vertical electric field of an ink-type reflection display device, a horizontal electric field formed by the plurality of sub-pixel electrodes 210 included in the pixel electrode layer is increased and the color resistance layer 112 and the sub-pixel electrodes 210 are prepared on the same side of the substrate 110, thus a color display is achieved and for the display panel, the ambient light may not be filtered by the color resistance layer during a white state display, thereby effectively improving a display brightness under the white state, and effectively solving a problem of a low brightness under the white state due to a low transmittance of the color resistance layer in a colored reflection display solution.

An embodiment of the present disclosure further provides a display apparatus, including the aforementioned display panel. Therefore, the display apparatus may have all features and advantages of the aforementioned display panel, which will not be repeated here.

Unless otherwise stated, all technical terms used in the present disclosure have the same meanings as are commonly understood by those skilled in the art to which the disclosure pertains. All patents and public publications to which this disclosure relates are incorporated in their entirety by reference. The term “containing” or “including” is an open-ended expression that includes the contents specified in the present disclosure but does not exclude other aspects. In the present disclosure, all the numbers disclosed here are approximate values no matter whether the words “about” or “approximately” are used. The value of each number may vary by less than 10% or by a reasonable value as those skilled in the art believe, such as 1%, 2%, 3%, 4% or 5%.

In the description of the present disclosure, it should be understood that the orientation or position relations indicated by the terms “length”, “width”, “thickness”, “upper”, “lower”, “front”, “back”, “left”, “right” and the like are based on the orientation or position relations shown in the drawings, which is only for the convenience of describing the present disclosure and simplifying the description, rather than indicating or implying that the apparatus or element referred to must have the specific orientation, or be constructed and operated in the specific orientation, and thus cannot be interpreted as limitation on the present disclosure.

In the description of the present disclosure, “first feature” and “second feature” may include one or more such features.

In the description of the present disclosure, “multiple” means two or more.

In the description of the present disclosure, the first feature being “over” or “under” the second feature may include the first feature being in direct contact with the second feature, or may include the first being not in direct contact with the second feature, but through additional features between them.

In the description of the present disclosure, the first feature being “over”, “above” and “on” the second feature include the first feature being directly above or obliquely above the second feature, or simply indicating that the first feature is horizontally higher than the second feature.

In the description of embodiments of the present disclosure, “A and/or B” may include any of a case of A alone, a case of B alone, and a case of A and B, where A and B are for example only, and may be any technical feature using “and/or” connections in an embodiment of the present disclosure.

In the description of this specification, description referring to terms “one embodiment”, “another embodiment”, etc. means that specific features, structures, materials, or characteristics described in connection with this embodiment are contained in at least one embodiment of the present disclosure. In this specification, a schematic expression of the above terms does not necessarily refer to a same embodiment or example. Moreover, the specific feature, structure, material, or characteristic described may be combined in a proper mode in any one or more embodiments or examples. In addition, if there is no conflict, those skilled in the art may integrate and combine different embodiments or examples and features of different embodiments or examples described in this specification. In addition, it should be noted that in the specification, terms "first" and "second" are used for the purpose of description only, but cannot be interpreted as indicating or implying relative importance or implicitly indicating a quantity of technical features indicated.

Although the embodiments of the present disclosure have been shown and described above, it should be understood that the above embodiments are exemplary, but cannot be understood as limitation on the present disclosure. Changes, modifications, substitutions and variations to the above embodiments may be made by those skilled in the art within the scope of the present disclosure.

The invention claimed is:

1. A display panel, comprising:

a first substrate and a second substrate arranged opposite to each other, wherein a side of the second substrate is a light incidence side;

a reflection layer located at a side of the first substrate;

a color resistance layer located at a side of the reflection layer away from the first substrate;

a pixel electrode layer located at a side of the color resistance layer away from the first substrate, wherein the pixel electrode layer comprises a plurality of sub-pixel electrodes arranged at intervals;

a common electrode layer located at a side of the second substrate; and pixel isolation posts located between the first substrate and the second substrate and defining a plurality of sub-pixel regions between the first substrate and the second substrate, wherein there are black charged microspheres and white charged microspheres in the plurality of sub-pixel regions;

wherein there are at least two of the sub-pixel electrodes in one of the sub-pixel regions, and an area of orthographic projections of the sub-pixel electrodes in one of the sub-pixel regions on the first substrate is smaller than an area of an orthographic projection of the color resistance layer on the first substrate, wherein the color resistance layer comprises a plurality of color resistance blocks arranged at intervals, the reflection layer comprises a plurality of reflection blocks arranged at intervals, and the reflection blocks and the color resistance blocks are arranged correspondingly, the display panel further comprises: an insulation layer located at a side of the color resistance layer away from the first substrate and covering the color resistance layer and the reflection layer; and wherein the insulation layer further comprises a plurality of through holes, orthographic projections of the through holes on the first substrate do not coincide with an orthographic projection of the reflection layer on the first substrate, the orthographic projections of the through holes on the first substrate do not coincide with the orthographic projection of the color resistance layer on the first substrate, the through holes are filled with the pixel electrode layer, and the pixel electrode layer is electrically connected with the first substrate through the through holes.

2. The display panel according to claim 1, wherein the display panel is configured to enable the white charged microspheres to move to the light incidence side when a first voltage is applied to all the sub-pixel electrodes and a second voltage is applied to the common electrode layer, to enable light incident from the light incidence side to be reflected by the white charged microspheres and emitted from the light incidence side to achieve a white state display.

3. The display panel according to claim 1, wherein the display panel is configured to enable the black charged microspheres to move to the light incidence side when a first voltage is applied to all the sub-pixel electrodes and a second voltage is applied to the common electrode layer, to enable light incident from the light incidence side to be absorbed by the black charged microspheres to achieve a dark state display.

4. The display panel according to claim 1, wherein the color resistance blocks comprise a red color resistance block, a green color resistance block, and a blue color resistance block;

the display panel is configured to enable light incident from the light incidence side to be reflected by the reflection layer and emitted from the light incidence side to achieve a color display when a first voltage and a second voltage are applied to at least two of the sub-pixel electrodes in one of the sub-pixel regions, wherein the first voltage and the second voltage are electrically opposite.

5. The display panel according to claim 4, wherein a difference between the first voltage and the second voltage is −40 to 40V.

6. The display panel according to claim 4, wherein a plurality of sub-pixel electrodes are contained in one of the sub-pixel regions, and a difference between voltages applied to adjacent sub-pixel electrodes is a fixed value.

7. The display panel according to claim 6, wherein a number of the sub-pixel electrodes in one of the sub-pixel regions is not more than 10.

8. The display panel according to claim 6, wherein the sub-pixel electrodes in the sub-pixel regions are arranged at equal intervals.

9. The display panel according to claim 6, wherein the plurality of sub-pixel electrodes in one of the sub-pixel regions are independently controlled for power supply by a drive circuit unit.

10. The display panel according to claim 1, wherein a material of the reflection layer is a metal material, and a reflectivity of the metal material is not less than 95%.

11. The display panel according to claim 1, wherein a thickness of the color resistance layer is 0.5 to 5 μm.

12. The display panel according to claim 1, wherein a diameter of a charged microsphere is 50 to 300 nm, and a charge-mass ratio of the charged microsphere is $1\times10^7$ to $10\times10^7$ C/kg.

13. The display panel according to claim 1, wherein the black charged microspheres and the white charged microspheres comprise spherical charged particles, or nearly spherical charged particles, or comprise both spherical charged particles and nearly spherical charged particles.

14. A preparation method for the display panel according to claim 1, comprising:

forming the reflection layer on the first substrate;

forming the color resistance layer on the side of the reflection layer away from the first substrate;

forming the pixel electrode layer on the side of the color resistance layer away from the first substrate;

forming the common electrode layer on the second substrate;

forming the pixel isolation posts on the first substrate and/or the second substrate;

aligning and coupling the first substrate with the second substrate to form a sub-pixel enclosed space; and injecting ink into the sub-pixel enclosed space and performing a sealing treatment to obtain the display panel.

15. A display apparatus, comprising: the display panel according to claim 1.

* * * * *